United States Patent
Nelson et al.

(10) Patent No.: US 6,814,644 B2
(45) Date of Patent: Nov. 9, 2004

(54) VALVE AND RETAINER FOR LATEX BALLOONS

(75) Inventors: David C. Nelson, Akron, OH (US); Martin A. Meluch, Newton Falls, OH (US)

(73) Assignee: Premium Balloon Accessories, Inc., Sharon Center, OH (US)

( * ) Notice: Subject to any disclaimer, the term of this patent is extended or adjusted under 35 U.S.C. 154(b) by 0 days.

(21) Appl. No.: 10/231,907

(22) Filed: Aug. 30, 2002

(65) Prior Publication Data

US 2004/0198150 A1 Oct. 7, 2004

(51) Int. Cl.⁷ ............................................. A63H 3/06
(52) U.S. Cl. ........................ 446/224; 446/221; 446/222
(58) Field of Search .................. 446/224, 220, 446/221, 222, 223, 225, 186, 226

(56) References Cited

U.S. PATENT DOCUMENTS

| | | | |
|---|---|---|---|
| 2,202,896 A | * | 6/1940 | Buchner et al. |
| 3,154,050 A | * | 10/1964 | Hanson |
| 3,871,422 A | * | 3/1975 | Elson |
| 4,004,614 A | * | 1/1977 | Mackal et al. |
| 4,167,204 A | | 9/1979 | Zeyra .......................... 141/348 |
| 4,681,138 A | * | 7/1987 | Giuliani |
| 4,701,148 A | | 10/1987 | Cotey |
| 4,750,314 A | | 6/1988 | Meitz et al. |
| 4,873,976 A | * | 10/1989 | Schreiber |
| 4,895,545 A | | 1/1990 | Nelson ........................ 446/220 |
| 4,994,073 A | * | 2/1991 | Green |
| 5,245,991 A | | 9/1993 | Kawaguchi |
| 5,496,203 A | | 3/1996 | Murray ........................ 446/222 |
| 5,944,576 A | | 8/1999 | Nelson et al. ............... 446/220 |
| 6,314,984 B1 | * | 11/2001 | Barriendos et al. .......... 137/223 |
| 6,430,804 B1 | | 8/2002 | Nelson et al. ................. 29/566 |

FOREIGN PATENT DOCUMENTS

| | | |
|---|---|---|
| DE | 43 43 139 | 5/1995 |
| GB | 2047 850 A | 12/1979 |

* cited by examiner

Primary Examiner—Derris H. Banks
Assistant Examiner—Ali Abdelwahed
(74) Attorney, Agent, or Firm—Renner, Kenner, Greive, Bobak, Taylor & Weber

(57) ABSTRACT

A valve and retainer assembly particularly useful for latex balloons is provided consisting of a valve body and a disk valve. The valve body has a retainer portion where the neck and mouth of a latex balloon may be received to affix the balloon to the valve body. A hollow stem communicates with the retainer portion, and a one-way valve allows gas to be introduced through the stem portion into the balloon affixed to the retainer portion. Once the balloon is filled the pressure of the gas within the balloon seals the valve closed to prevent gas from exiting the balloon.

16 Claims, 3 Drawing Sheets

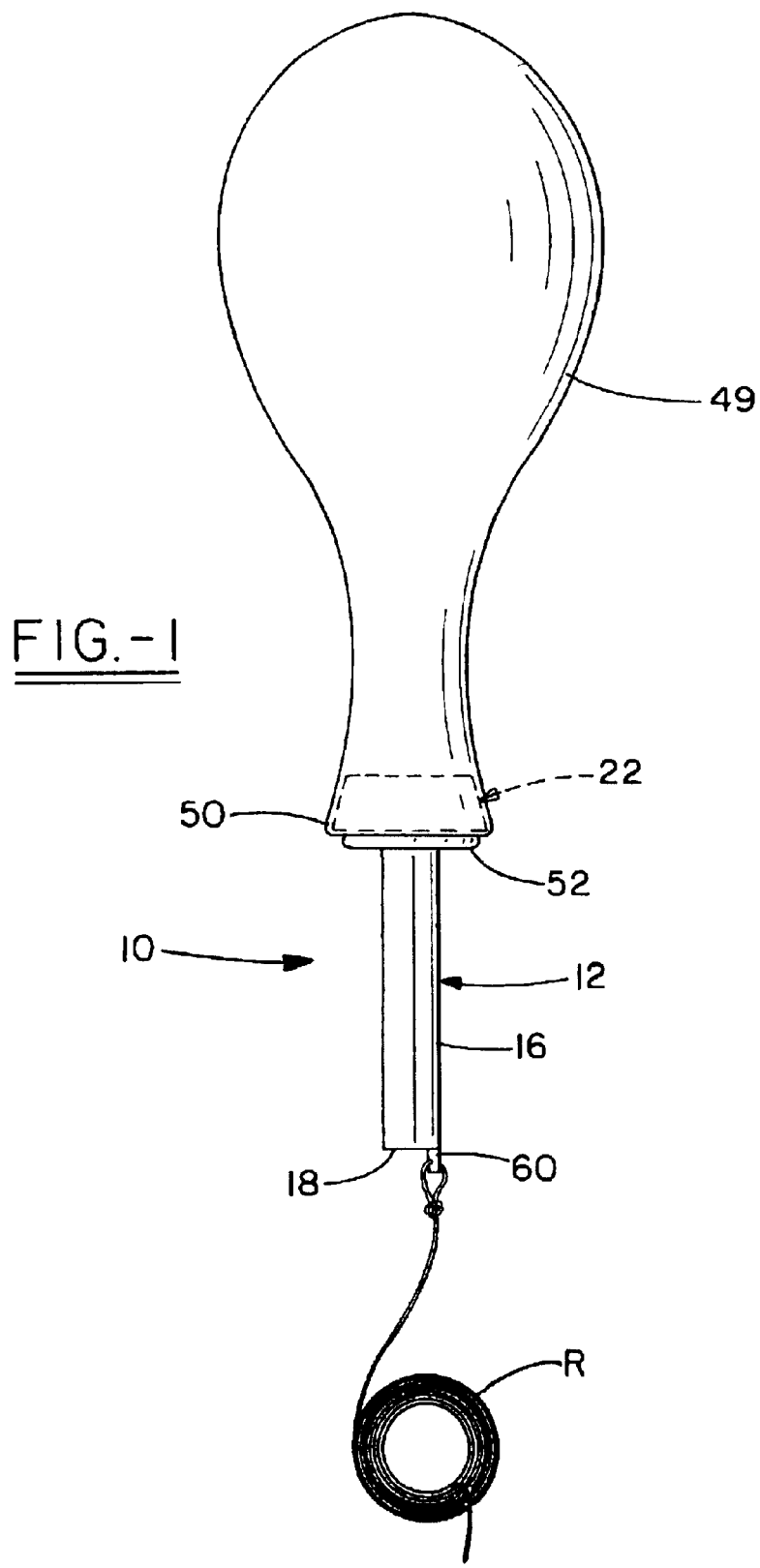

VALVE AND RETAINER FOR LATEX BALLOONS

BACKGROUND OF THE INVENTION

The present invention generally resides in the art of balloon devices and accessories. More particularly, the present invention relates to a valve and retainer assembly for a latex balloon, and its method of use.

The use of latex balloons as decorations for parties, celebrations, grand openings, and other events is well known, and millions of balloons are so used each year. At many of these events, a substantially large number of latex balloons are decoratively employed, and, many times, the latex balloons are printed with indicia that is particular to the specific event. In such cases, the balloons are special ordered, at significant expense. Decorating the event may also entail a significant expense inasmuch as a great amount of time and effort is required to fill these latex balloons and affix them to ribbons or balloon sticks, for display at the event. Thus, manufacturers involved with providing such balloons have endeavored to provide latex balloons with valves that avoid the need for tying balloon necks to retain gas therein, and increase the rate at which these balloons might be filled with gas and attached to ribbons or sticks, as desired. The prior art valve and retainer assemblies, however, are quite complex, and are undesirably difficult to manufacture, assemble, and use. Thus, there is a need in the art for a valve and retainer assembly that is easy to manufacture, assemble, and use in filling latex balloons.

The valves that are currently employed in the art are significantly heavy, such that, when these valves are associated with latex balloons that are filled with helium or other lighter-than-air gases, the lift factor of these balloons, typically measured in hours of float time, is significantly decreased. Many times, these valves will also alter the balance of a balloon as it floats at the end of a ribbon. Thus, there also exists a need in the art for a valve and retainer assembly for a latex balloon that has a minimal impact on the lift factor of a lighter-than-air balloon, and which allows the balloon to be attached to a ribbon without significantly altering the orientation at which the balloon floats.

Additionally, valves of the prior art are difficult to inflate, requiring significant pressures to force the inflation gas past the valve and into the balloon. Thus, there exists a need in the art for a valve that allows for inflation under low pressures, even so low as to allow for normal mouth inflation of balloons through the valve.

SUMMARY OF THE INVENTION

In general, the present invention provides a valve and retainer assembly for a balloon including a valve body and a disk valve inserted therein. The valve body includes a stem portion and a retainer portion. The stem portion is hollow from a first end to a second end thereof, and the retainer portion includes a sealing shoulder that extends radially from the second end of the stem portion. The retainer portion provides a disk valve aperture and at least one fill aperture, both of which communicate with the hollow of the stem portion. The retainer portion further includes an annular ring that extends above the sealing shoulder, around a perimeter thereof, to define a recess above the sealing shoulder and below the top of the annular ring. The annular ring also extends below the sealing shoulder, around the perimeter of the sealing shoulder, to provide an annular shoulder below the sealing shoulder. The disk valve includes a flexible flapper disk that has a top surface and a bottom surface and a plug extending from the bottom surface. The plug is retained by the disk valve aperture, such that the flapper disk rests within the recess defined above the sealing shoulder, and the bottom surface of the flapper disk covers the at least one fill aperture in the sealing shoulder.

To use the valve and retainer assembly, the mouth of a latex balloon, which is typically defined by a rolled portion of balloon material, is stretched over the annular shoulder that is provided below the sealing shoulder by the annular ring. The configuration of the valve and retainer assembly is such that gas pressure applied through the hollow of the stem portion, against the bottom surface of the flapper disk, will cause the flapper disk to flex to allow gas to flow from the hollow of the stem portion upwardly through the at least one fill aperture. When a balloon is fixed to the valve and retainer assembly as just described, gas flowing through the hollow of the stem portion in this manner will fill the balloon, while the pressure of the gas within the balloon will apply pressure against the top surface of the flapper disk to cause the flapper disk to seal against the at least one fill aperture and prevent gas from flowing out from the balloon into the hollow of the stem portion. Thus, the flapper disk acts as a oneway valve that allows a balloon affixed to the valve and retainer assembly to be filled with gas and sealed, without tying the neck of the balloon. This significantly increases the speed at which multiple latex balloons might be filled from a pressurized gas source and, thereafter, employed to decorate a particular event.

Thus, it is envisioned that entities desiring to employ a great number of balloons in decorating an event would desire to have the valve and retainer assemblies of this invention provided with balloons and/or ribbons or balloon sticks affixed thereto, while the balloon is in an un-inflated state, such that mass quantities of un-inflated balloons could be provided to such an end consumer, who, upon receipt, could easily inflate the balloons and decorate the event. With this undersanding in mind, the present invention also provides, in combination, a balloon and a valve and retainer assembly for a balloon comprising: a balloon including a neck portion having a mouth defined by a rolled portion of balloon material; and a valve and retainer assembly including: a valve body having a stem portion and a retainer portion, said stem portion being hollow from a first end to a second end thereof, said retainer portion including a sealing shoulder extending radially from said second end of said stem portion and providing a disk valve aperture and at least one fill aperture, both said disk valve aperture and said at least one fill aperture communicating with the hollow of said stem portion, and a annular ring extending above said sealing shoulder, around a perimeter thereof, such that said sealing shoulder is recessed below a top of said annular ring, and further extending below said sealing shoulder, around said perimeter thereof, to provide an annular shoulder below said sealing shoulder; and a disk valve including a flexible flapper disk having a top surface and a bottom surface and a plug extending from said bottom surface of said flapper disk, wherein said plug is retained by said disk valve aperture such that said flapper disk rests within said recess defined above said sealing shoulder, and said bottom surface of said flapper disk covers said at least one fill aperture in said sealing shoulder, wherein said rolled portion of balloon material defining said mouth is received under said annular shoulder provided by said annular ring.

DESCRIPTION OF THE DRAWINGS

FIG. 1 is an elevational view illustrating the application of the invention for inflation of a balloon, the balloon in the Fig. being illustrated as uninflated;

PREFERRED EMBODIMENT FOR CARRYING OUT THE INVENTION

Figure 3:
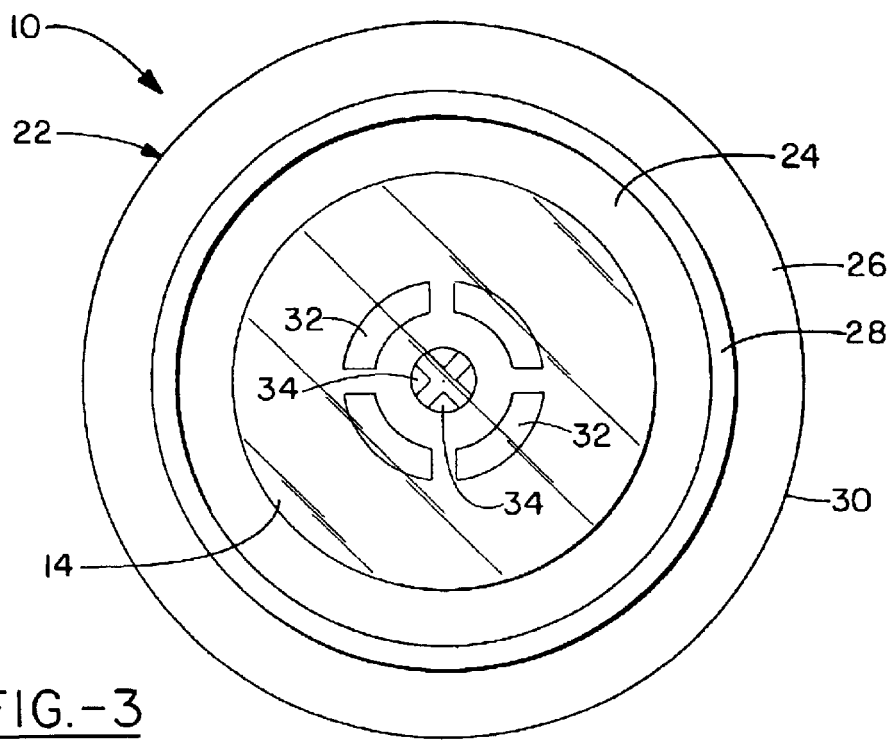
FIG. 3 is a top view.
Figure 2:
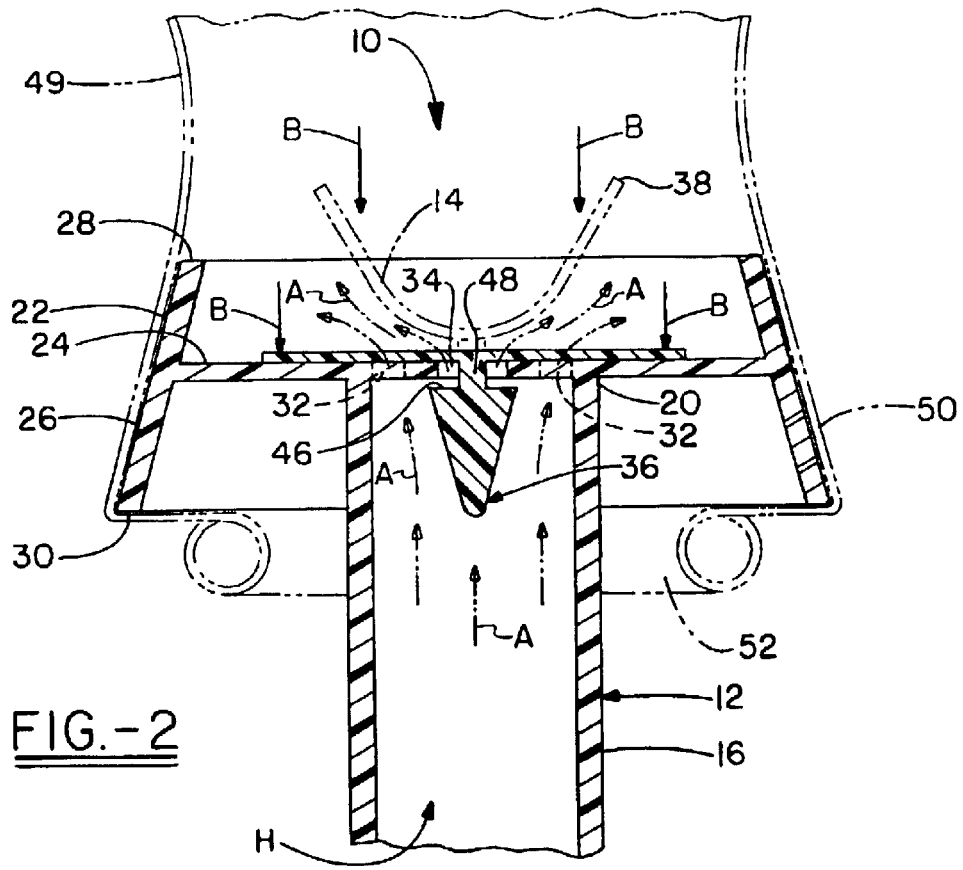
FIG. 2 is a greatly enlarged elevational view, in partial section, illustrating the valve device of the invention.
Figure 4:
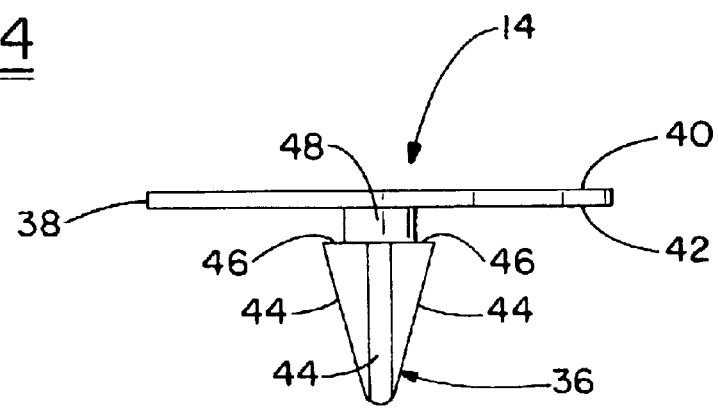
FIG. 4 is an enlarged top view of the valve mechanism.
Figure 5:
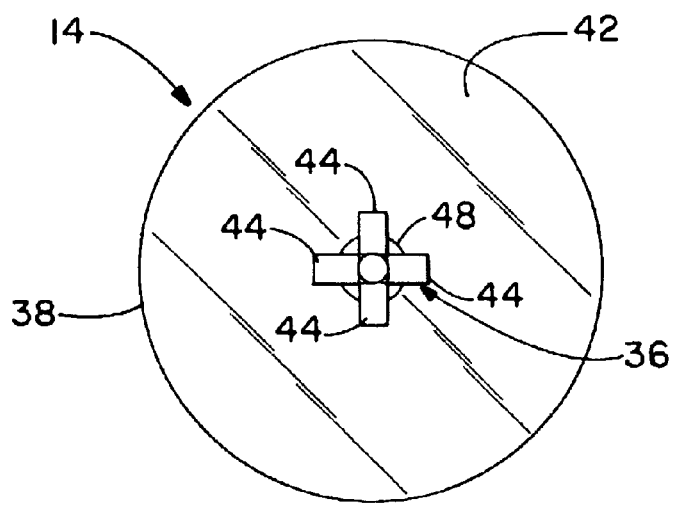
FIG. 5 is an enlarged elevational view.

With reference to FIGS. 1–3, it can be seen that a valve and retainer assembly according to this invention is designated generally by the numeral 10. Valve and retainer assembly 10 includes valve body 12, which, as will be described below, receives disk valve 14. Valve body 12 includes stem portion 16, which is hollow from first end 18 to second end 20, as represented by the letter H in FIG. 2. Valve body 12 further includes retainer portion 22 that extends from stem portion 16. More particularly, retainer portion 22 includes sealing shoulder 24, which extends radially from second end 20 of stem portion 16, and annular ring 26, which extends above and below sealing shoulder 24, around the perimeter thereof, such that sealing shoulder 24 is recessed below top 28 of annular ring 26, and annular shoulder 30 is provided below sealing shoulder 24. Although this invention is not to be so limited, it is preferred that valve body 12, including stem portion 16 and retainer portion 22, be molded as a single component. Additionally, it is preferred that sealing shoulder 24 and retainer portion 22 be circular in cross-section inasmuch as retainer portion 22 serves to retain a balloon, and a generally circular shape would serve to accommodate the circular cross-section shape of the neck and mouth of a balloon. The manner in which a balloon is affixed to valve and retainer assembly 10 will be particularly considered hereinbelow.

With reference to FIGS. 2 and 3, it can be seen that apertures are provided in sealing shoulder 24 to communicate with hollow H of stem portion 16, and, further, to receive disk valve 14. In the preferred embodiment of FIG. 2, four fill apertures 32 are symmetrically spaced surrounding a single disk valve aperture 34, which is centrally located with respect to hollow H of stem portion 16. Notably, all apertures communicate with hollow H of stem portion 16.

Disk valve aperture 34 is identified as such because it is an aperture that is provided to receive disk valve 14. More particularly, it can be seen that disk valve 14 includes plug 36 that is provided to removably insert into disk valve aperture 34, to bring disk valve 14 into contact with sealing shoulder 24. When in position, as shown in FIG. 3, disk valve 14 covers fill apertures 32.

With particular reference to FIGS. 2–5, disk valve 14 includes flexible flapper disk 38, having top surface 40 and bottom surface 42. Plug 36 extends from bottom surface 42, and the entire disk valve 14 is preferably molded out of a very flexible material, as a one-piece valve. Plug 36 includes two orthogonally intersecting triangular barbs 44, which provide flanges 46 extending from an extension 48 of plug 36. Triangular barbs 44, as mentioned, are made of a flexible material, and, additionally, they terminate in a point, such that plug 36 may be removably attached to valve body 12 by inserting triangular barbs 44, point-first, into disk valve aperture 34. During insertion, triangular barbs 44 are deformed by disk valve aperture 34, but return to their original orthogonally intersecting configuration upon full insertion through disk valve aperture 34 so that flanges 46 of triangular barbs 44 provide resistance against the removal of plug 36 from disk valve aperture 34. Extension 48 is preferably sized to the thickness of sealing shoulder 24, at disk valve aperture 34, such that bottom surface 42 of plug 36 lies flush on the top of sealing shoulder 24, while flanges 46 intimately contact the underside thereof.

With reference to FIG. 2 it can be seen how disk valve 14 operates as a one-way valve on valve and retainer assembly 10. As shown in phantom, gas flowing in the direction of arrow A will push upwardly on flapper disk 38, at fill apertures 32, and, due to the flexible nature of flapper disk 38, flapper disk 38 will be forced upward to allow gas to flow past fill apertures 32 and fill a balloon 49. Arrows also represent the potential for gas in the direction of arrow A to flow through any gap between extension 48 and disk valve aperture 34, although the fit might be such that gas does not flow in this manner. Gas pressured in the direction of arrow B will push against the top surface of flapper disk 38, thereby increasing the seal between flapper disk 38 and fill apertures 32, as shown in non-phantom, such that gas cannot flow in the direction of arrow B into stem portion 16 (i.e., a filled balloon will not deflate). Notably, the configuration of the preferred embodiment, wherein fill apertures 32 are symmetrically shaped and spaced, aids in the efficient operation of flapper disk 38, because gas pressurized through stem portion 16 will push equally through each fill aperture 32 and completely raise the same from sealing shoulder 24.

It can be seen that a latex balloon 49 is affixed to valve and retainer assembly 10 simply by stretching neck portion 50 over retainer portion 22 and securing the mouth 52, which is defined by a rolled portion of balloon material, under the annular shoulder 30 of retainer portion 22. As seen in the FIGS., retainer portion 22 is preferably tapered from top 28 to its bottom. This tapered configuration serves to help secure balloon 49 in assembly 10 however, it should be appreciated that the tapered configuration is preferred only, and retainer portion 22 might be configured with a parallel annular ring 26 or an annular ring 26 that tapers in the opposite direction.

When a balloon 49 is affixed to valve and retainer assembly 10, in this manner, gas may be introduced into balloon 49, from a pressurized source, upwardly through stem portion 16, and the pressurized gas will open disk valve 14, off of fill apertures 32, to allow the gas to fill balloon 49. Once balloon 49 is filled, the pressurized gas source may be removed, and the pressure of the gas within balloon 49 will seal disk valve 14 on sealing shoulder 24, over fill apertures 32, thereby maintaining balloon 49 in its filled state. Notably, although the term "pressurized gas source" has been employed, it should be noted that disk valve 14 is preferably flexible enough to allow a balloon affixed to valve and retainer assembly 10 to be filled, as is a typical latex balloon, by mouth.

Referring back to FIG. 1, stem portion 16 of valve body 12 preferably includes slot 60, proximate first end 18. Slot 60 is provided for receiving a ribbon R, particularly, for tying or heat sealing a ribbon R to stem portion 16. Slot 60 is particularly useful when valve and retainer assemblies 10 are to be employed with balloons that are to be filled with lighter-than-air gases, such as helium, because it is quite common to float lighter-than-air balloons on the end of ribbons. Notably, by providing slot 60 proximate first end 18, a combination balloon 49 and valve and retainer assembly 10 affixed to the ribbon R would orient itself in a substantially straight up-and-down manner, thereby maintaining the aesthetics of a typical lighter-than-air balloon in which the ribbon is tied directly to the neck of the balloon. In some valves of the prior art, the ribbon is stapled to the valve, which is believed to be more burdensome and costly than tying, and is more of a danger to children. Additionally, ribbons attached to valves of the prior art are affixed at a position that causes the balloon to offset from a substantially straight up-and-down orientation, and, in such an orientation, the balloon may tend to pull off of the valve and retainer assembly.

Stem portion 16 might instead of receiving ribbon R, might receive a balloon stick inserted at first end 18 into hollow H. The provision of balloon sticks in this manner is well known in the art.

Valves of the prior art weigh on the order of about 2.5 grams and higher. It will be appreciated that, when lighter-than-air gases are employed to fill a balloon with an associated valve, this weight decreases the float time of the balloon. Indeed, as compared to balloons with such heavy valves, a balloon without a valve (i.e., with its neck knotted closed) will exhibit an increased float time of several hours. When considering balloon valves on the order of around 3 grams, a difference of about 1 gram in weight may translate to a difference in several hours of float time. Thus, valve and retainer assemblies according to this invention are preferably lighter than about 2 grams, although the present invention is not to be limited thereto or thereby. More preferably, valve and retainer assemblies according to this invention are less than about 1.7 grams, and, even more preferably, less than 1.5 grams.

It will be appreciated that, due to the simple configuration of valve and retainer assemblies according to this invention, very light valve and retainer assemblies may be manufactured simply by designing lightweight, thin wall valve body assemblies with valves that provide the desired utility and meet all applicable child safety standards for dimensional minimums. It is a feature of this particularly preferred valve to address all three criteria—light overall weight to increase float time, minimum size requirements to pass C.P.S.C (consumer products safety commission) "no-choke" child-safe test, and provide a valve that quickly and reliably allows a balloon to be inflated and prevents gas loss therefrom. As such, it is desirable to produce the valve body from a lightweight, yet suitably strong polymeric material, while producing the disk valve from an equally lightweight, yet very flexible material that allows from inflation of a balloon through the introduction of a minimal pressure of gas through the stem, even through the pressure introduced by a person blowing through the stem. A suitable material has been found to be Santoprene® thermoplastic rubber (Advanced Elastomer Systems).

It will be appreciated that the valve and retainer assembly 10 of this invention is easy to manufacture, assemble, and use. Indeed, it is contemplated that valve and retainer assemblies according to this invention would be provided in combination with uninflated balloons, as in FIG. 1, such that an end user would simply have to introduce pressurized gas through stem portion 16 to inflate the balloons, without the need for tying the neck of the balloon. Such a provision of a combination balloon and valve and retainer assembly could amount to a significant reduction in the time and money spent to decorate an event, especially for special events in which a multitude of personalized balloons might be used to decorate the event, Additionally, a ribbon R might be provided with the combination balloon and valve and retainer assemblies as shown in FIG. 1. When the balloons are to be filled with lighter-than-air gases, the provision of a ribbon as already tied to the valve and retainer assembly would help reduce decoration time to an even greater extent. Similarly, balloon sticks might also be provided with the combination balloon and valve and retainer assembly such that, upon inflation of the balloon, a balloon stick could simply be inserted into stem 16 to provide a balloon on the end of a stick.

In light of the foregoing, it should thus be evident that the process of the present invention, providing a valve and retainer assembly for latex balloons, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A valve and retainer assembly for a balloon comprising:
   a balloon including a neck portion having an open mouth; and a valve and retainer assembly including:
   a unitary valve body including a stem portion integral with a retainer portion, said stem portion being hollow from a first end to a second end thereof,
   said retainer portion including a sealing shoulder extending radially outwardly from said stem portion, said second end of said stem portion providing a disk valve aperture and at least one fill aperture, said at least one fill aperture communicating with the hollow of said stem portion, and an annular ring integral with said sealing shoulder and extending above said sealing shoulder, around a perimeter thereof, such that a recess is defined below a top of said annular ring; and
   a disk valve including a flexible flapper disk having a top surface and a bottom surface and a plug extending from said bottom surface of said flapper disk, wherein said plug is retained by said disk valve aperture and said bottom surface of said flapper disk covers said at least one fill aperture in said second end of said stem portion; wherein said open mouth of said balloon is received around said annularring.

2. The valve and retainer assembly of claim 1, wherein said annular ring is tapered from a smaller perimeter at said top of said annular ring to a larger perimeter at a bottom of said annular ring.

3. The valve and retainer assembly of claim 1, wherein said second end of said stem portion provides at least two fill apertures symmetrically spaced around said disk valve aperture, said flapper disk covering said at least two fill apertures.

4. The valve a nd retainer assembly of claim 3, wherein said second end of stem portion provides four fill apertures symmetrically spaced around said disk valve aperture, said flapper disk covering all four of said fill apertures.

5. The valve and retainer assembly of claim 1, wherein said plug of said disk valve is removably inserted in said disk valve aperture.

6. The valve and retainer assembly of claim 5, wherein said plug consists of two orthogonally intersecting triangular barbs each providing a flange extending from an extension of said plug, said triangular barbs being made of a flexible material and terminating in a point such that said plug may be inserted into said disk valve aperture, with said triangular barbs being deformed thereby, during insertion, and returning to their original orthogonally intersecting configuration upon full insertion through said disk valve aperture so that said flanges of said triangular barbs provide resistance against removal of said plug from said disk valve aperture.

7. The valve and retainer assembly of claim 1, wherein gas pressure applied through said hollow of said stem portion against said bottom surface of said flapper disk will cause said flapper disk to flex to allow gas to flow from said hollow of said stem portion upwardly through said at least one fill aperture, and gas pressure applied against said top surface of said flapper disk will cause said flapper disk to seal against said at least one fill aperture and prevent gas from flowing into said hollow of said stem portion.

8. The valve and retainer assembly of claim 1, wherein the valve and retainer assembly weighs less than 2 grams.

9. The valve and retainer assembly of claim 1, wherein said stem portion includes a ribbon slot proximate said first end of said stem portion.

10. The valve and retainer assembly of claim 1, wherein said hollow of said stem portion is configured to receive a balloon stick.

11. In combination, a balloon and a valve and retainer assembly for a balloon comprising:

a balloon including a neck portion having an open mouth; and a valve and retainer assembly including:

a unitary valve body including a stem portion integral with a retainer portion, said stem portion being hollow from a first end to a second end thereof, said retainer portion including a sealing shoulder extending radially outwardly from said stem portion, said second end of said stem portion providing a disk valve aperture and at least one fill aperture, said at least one fill aperture communicating with the hollow of said stem portion, and an annular ring integral with said sealing shoulder and extending above said sealing shoulder, around a perimeter thereof, such that a recess is defined below a top of said annular ring, said annular ring further extending below said sealing shoulder, around said perimeter thereof, to provide an annular shoulder below said sealing shoulder; and a disk valve including a flexible flapper disk having a top surface and a bottom surface and a plug extending from said bottom surface of said flapper disk, wherein said plug is retained by said disk valve aperture and said bottom surface of said flapper disk covers said at least one fill aperture in said second end of said stem portion;

wherein said open mouth of said balloon is received under said annular shoulder provided by said annular ring.

12. The combination of claim 11, wherein said stem portion of said valve and retainer assembly includes a ribbon slot proximate said first end of said stem portion.

13. The combination of claim 12, further comprising a ribbon affixed to said ribbon slot.

14. The combination of claim 11, wherein said hollow of said stem portion is capable of receiving a balloon stick.

15. The combination of claim 11, wherein said balloon is pressurized with gas, and said flapper disk prevents gas from exiting said balloon through said at least one fill aperture in said second end of said stem portion.

16. The combination of claim 11, wherein said balloon is deflated and may be inflated by introducing gas upwardly through said hollow of said stem portion, from said first end to said second end thereof, said disk valve allowing such gas to enter said balloon through said at least one fill aperture.

* * * * *